April 12, 1960 R. FLÖTGEN 2,932,521

PHONOGRAPH RECORDS

Filed Oct. 18, 1955

Inventor:
RUDOLF FLÖTGEN
BY Toulmin & Toulmin
Attorneys

United States Patent Office 2,932,521

Patented Apr. 12, 1960

2,932,521

PHONOGRAPH RECORDS

Rudolf Flötgen, Kassel, Germany, assignor to Licentia Patent-Verwaltungs-G.m.b.H., Hamburg, Germany Application October 18, 1955, Serial No. 541,231

Claims priority, application Germany October 18, 1954

12 Claims. (Cl. 274—42)

The present invention relates to phonograph records, more particularly, to a phonograph record positionable upon turntables having various diameter spindles.

Phonograph records which are adapted for playing on turn-tables having spindles of varying diameters are conventionally provided with a removable center piece or adapter. The center piece is generally connected with the edges of the spindle opening of the record. This construction has a disadvantage in that it is frequently impossible to detach the adapter from the edges of the spindle opening of the record, since the residues left on the edges of the spindle hole opening will impair a proper positioning of the record upon a turn-table having a larger diameter spindle.

As an alternative to this construction, some phonograph records adapted for playing on turn-tables having various diameter spindles have transition areas on the spindle opening which are formed by recesses on the edge of said opening. The manufacture of these records, however, requires special tools which considerably increases the cost of production.

The present invention discloses an adapter and a method for constructing a phonograph record with the adapter and a method for constructing a phonograph record with the adapter affixed thereto which eliminates the above disadvantages.

In the present invention the phonograph record disclosed herein essentially comprises a disc having a spindle opening with a removable adapter or centerpiece positioned therein. The adapter has spaced notches about the periphery thereof which are adapted to cooperate with correspondingly spaced recesses in the edge of the spindle opening.

It is therefore the principal object of this invention to provide an improved phonograph record which is readily adaptable for playing upon turn-tables having various diameter spindles.

It is another object of this invention to provide a simple and economical adapter for phonograph records.

It is a further object of this invention to provide an adapter for phonograph records which may be readily detached from the record without injuring the record in any way.

It is an additional object of this invention to provide an economical method of manufacturing a phonograph record and a spindle adapter therefor.

Other objects and advantages of this invention will become readily apparent upon reference to the following description when taken in conjunction with the accompanying drawings, wherein.

Figure 1:
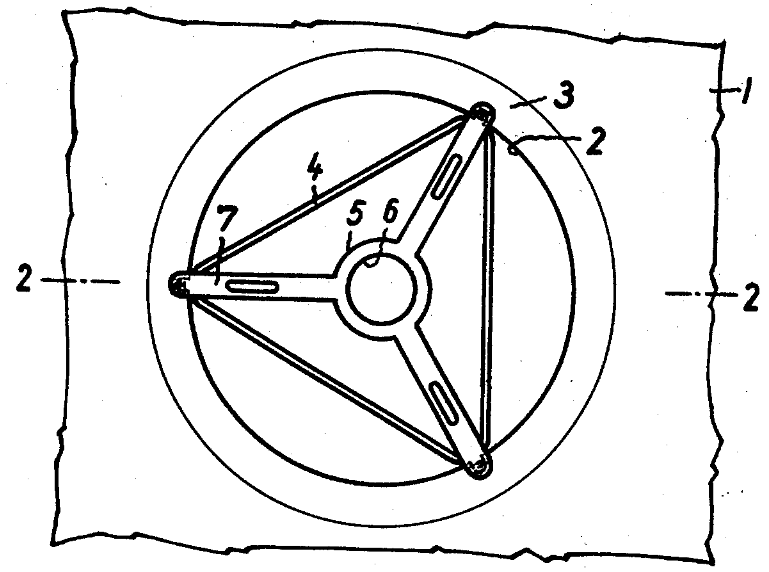
Fig. 1 is a plan view of the spindle adapter of this invention positioned in the spindle opening of a phonograph record.

Returning now to the drawings, more particularly to Fig. 1 wherein like reference symbols indicate the same parts throughout the various views, 1 indicates a phonograph record which is in the form of a disc. The record disc 1 has a centrally located spindle opening 2 therein, which is surrounded by an annular portion 3 which has a thickness somewhat less than the thickness of the record 1. This relationship may be more clearly seen in Fig. 2.

The removable adapter or centerpiece 4 is removably mounted within the spindle opening 2. The adapter 4 comprises a central portion 5 having an aperture 6 therein which closely receives the spindle of the record turn-table. A plurality of equally spaced legs 7 extend radially outwardy from the central portion 5. The leg 7 may be reinforced by means of a filler 8 between each pair of legs. Others forms of reinforcement may be employed such as rod-like members interconnecting the ends of the legs 7.

Figures 2, 3, 4:
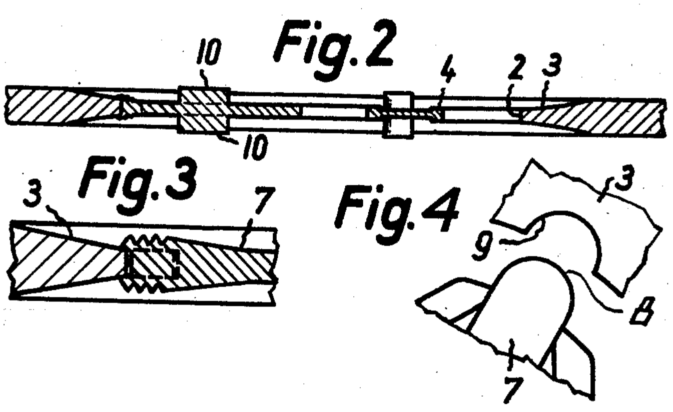
Fig. 2 is a sectional view taken along the lines 2—2 of Fig. 1.
Fig. 3 is an enlarged view of a portion of Fig. 2, showing the connection between the adapter and the edge of a record spindle opening.
Fig. 4 is a plan view in enlarged scale of one end of the adapter illustrated in Fig. 1 to illustrate the notch on the adapter which cooperates with a recess in the edge of the record spindle opening.

Each of the legs 7 has a notch 8 seen in Fig. 4 upon the end thereof. The notch 8 is essentially semi-circular in shape and is adapted to cooperate with a recess 9 in the edge of the spindle opening 2. The recesses 9 are correspondingly spaced about the edge of the spindle opening 2 in order to operatively cooperate with the notches 8.

Each of the legs 7 is also provided with an elevated ledge 10 upon both faces thereof. The ledges 10 have a combined thickness somewhat greater than the thickness of the record disc 1. The raised ledges 10 assist in spacing the records when assembled in stacked relationship.

A tightly fitting connection is achieved when the adapter 4 has overlapping portions on its extreme ends with respect to the spindle hole of the record, as shown in Figure 1 of the drawings. The overlapping portions may be on one or on both sides of the adapter. By positioning the overlapped portions on only one side of the adapter, the adapter may be repeatedly pushed into and out of the spindle opening.

An improved connection between the adapter and the record may be obtained by placing the overlapped portions on both faces of the adapter as previously described.

In order to insure that the phonograph record is properly and tightly centered with its centerpiece on the turntable spindle and in order to prevent loosening and angular twisting of the record with respect to the centerpiece, the centerpiece is formed with notches on the ends thereof which engage the recesses in the edge of the spindle opening in the manner previously described. These recesses in the edge of the spindle opening are uniformly spaced. However, it is readily apparent that any spacing of the recesses will be satisfactory.

With respect to manufacture of the adapter, it has been found to be advantageous to form the recesses and the corresponding notches in the adapter in the form of a semi-circle. However, any other suitable geometrical form may be employed without departing from the spirit of this invention.

The assembly of the adapter with the record during the manufacture thereof may be achieved by inserting the previously fabricated centerpiece into the record and clamping the centerpiece together with the record by means of suitable pressing apparatus. In this manner the connecting or clamping areas on the spindle opening are obtained by means of a brief thermal softening of the adapter, which preferably consists of a thermoplastic material which may be the same or different from the record material. The ends of the adapter may be pressed over the edges of the spindle openings by clinching the notches into the recesses as illustrated in Fig. 3.

The fabricated centerpieces, which are intended to be inserted into the spindle opening, can be easily, neatly and accurately manufactured from suitable thermoplastic material by a spraying process.

In addition, the centerpiece may be sprayed directly into the record during the manufacture of the record. In this process a flowing of portions of the adapter over the edges of the spindle opening will occur and this overflowing will result in the overlapping portions of the centerpiece previously referred to.

Thus it can be seen that the present invention discloses a phonograph record having a centerpiece or adapter which enables the record to be played upon turn-tables having various diameter spindles. The adapter is simple in construction and may be repeatedly removed and replaced within the spindle opening of the record. Furthermore, the adapter may be made as an integral part of the record and may be removed therefrom by the purchaser, or may be manufactured separately from the record and placed within the spindle opening prior to packaging of the completed record. The ultimate result is an economical arrangement which permits the conventional disc type phonograph record to be readily adapted for positioning upon various sized turn-table spindles.

It will be understood that this invention is susceptible to modification in order to adapt it to different usages and conditions, and, accordingly, it is desired to comprehend such modifications within this invention as may fall within the scope of the appended claims.

What is claimed is:

1. A phonograph record comprising, in combination, a disc having a central opening for receiving a spindle and a plurality of spaced recesses in the edge of said opening; and adapter means forming a unit separate from said disc having a central opening smaller that that of said disc for receiving a spindle smaller than that which said central opening of said disc may receive, said adapter means having a plurality of radially extending portions which are wedged into said recesses, respectively, whereby angular displacement of said adapter means with respect to said disc is prevented.

2. A phonograph record comprising, in combination, a disc having a central opening for receiving a spindle and a plurality of spaced recesses in the edge of said opening; and adapter means forming a unit separate from said disc having a central opening smaller than that of said disc for receiving a spindle smaller than that which said central opening of said disc may receive, said adapter means having a plurality of radially extending portions which are wedged into said recesses, respectively, and substantially fill the same, whereby angular displacement of said adapter means with respect to said disc is prevented.

3. A phonograph record comprising, in combination, a disc having a central opening for receiving a spindle and a plurality of spaced recesses in the edge of said opening; and adapter means forming a unit separate from said disc having a central opening smaller than that of said disc for receiving a spindle smaller than that which said central opening of said disc may receive, said adapter means having a plurality of radially extending portions with notched ends which are wedged into said recesses, respectively, and which overlap said disc in the regions of the respective recesses thereof, whereby angular displacement of said adapter means with respect to said disc is prevented.

4. A phonograph record comprising, in combination, a disc having a central opening for receiving a spindle and a plurality of spaced recesses in the edge of said opening; and adapter means forming a unit separate from said disc having a central opening smaller than that of said disc for receiving a spindle smaller than that which said central opening of said disc may receive, said adapter means having a plurality of radially extending portions with notched ends which are wedged into said recesses, respectively, and which overlay both sides of said disc in the regions of the respective recesses thereof, whereby angular displacement of said adapter means with respect to said disc is prevented.

5. A phonograph record as defined in claim 1 wherein said plurality of recesses are equally spaced from each other and wherein said adapter means is in the form of a regular polygon with said radially extending portions being located at the corners of said polygon.

6. A phonograph record as defined in claim 1 wherein said disc and said adapter means are made of the same material.

7. A phonograph record as defined in claim 1 wherein said disc and said adapter means are made of different material.

8. A phonograph record as defined in claim 1 wherein said adapter means has circumferentially spaced raised portions upon both faces thereof.

9. A phonograph record as defined in claim 8 wherein said raised portions extend above the respective faces of said disc.

10. A phonograph record as defined in claim 1 wherein the inner annular edge portion of said disc is tapered toward the center of said disc.

11. A phonograph record as defined in claim 1 wherein the inner annular edge portion of said disc is tapered toward the center of said disc and wherein said radially extending portions of said adapter means which are wedged into said recesses also overlap said disc in the regions of the respective recesses thereof.

12. A phonograph record as defined in claim 11 wherein those parts of said portions which overlap said disc are entirely within the space bounded by the planes of the two faces of said disc.

References Cited in the file of this patent

UNITED STATES PATENTS

| | | |
|---|---|---|
| 870,961 | Hoffman | Nov. 12, 1907 |
| 1,737,619 | Smith | Dec. 3, 1929 |
| 2,585,622 | Bridenbaugh et al. | Feb. 12, 1952 |
| 2,605,506 | Miller | Aug. 5, 1952 |
| 2,619,351 | Kennedy | Nov. 25, 1952 |
| 2,712,943 | Morrison | July 12, 1955 |
| 2,734,748 | Parvin | Feb. 14, 1956 |